Figure 1:
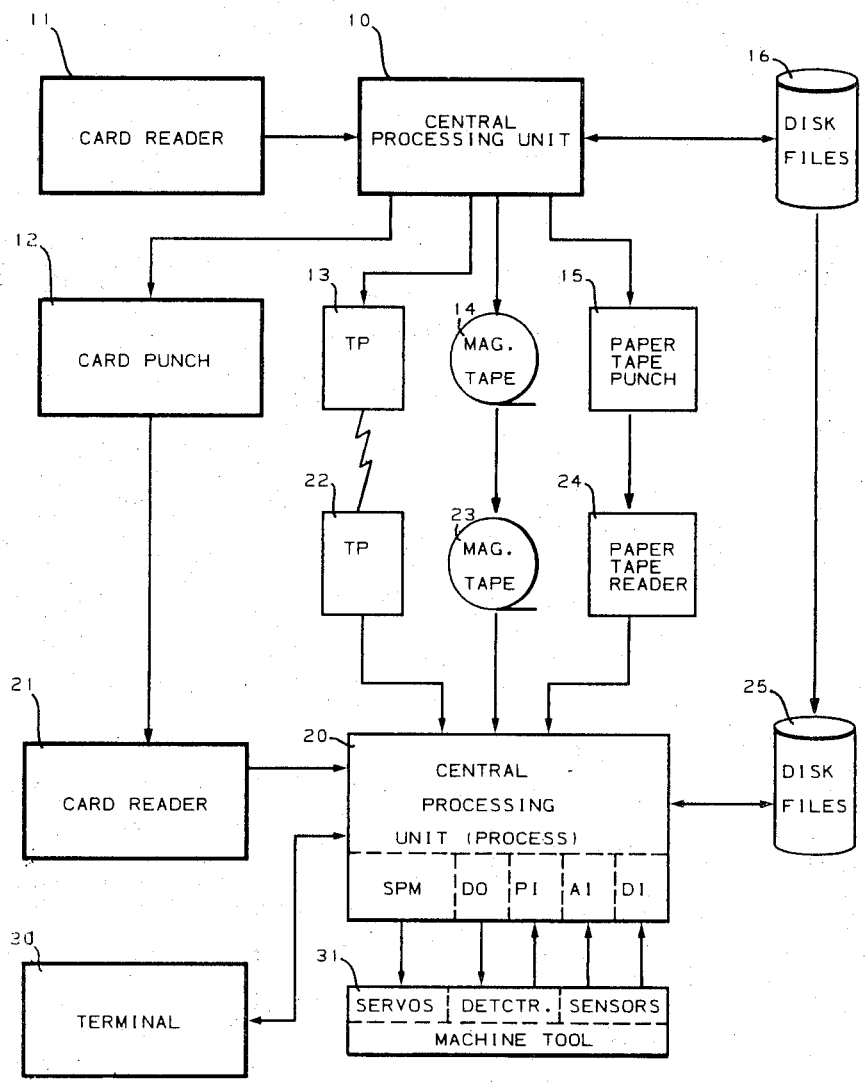
Figure 2:
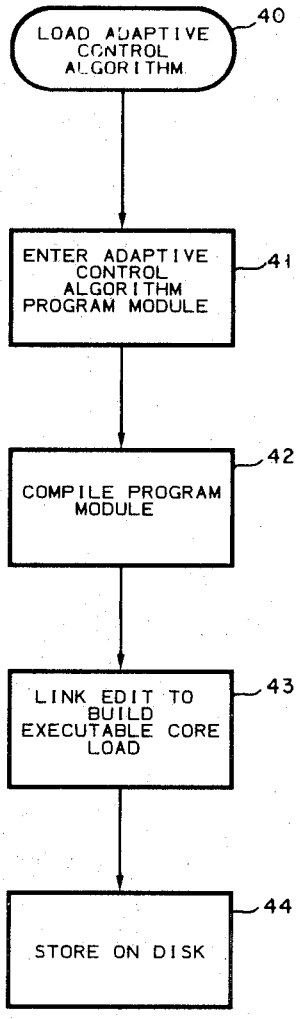
Figure 3:
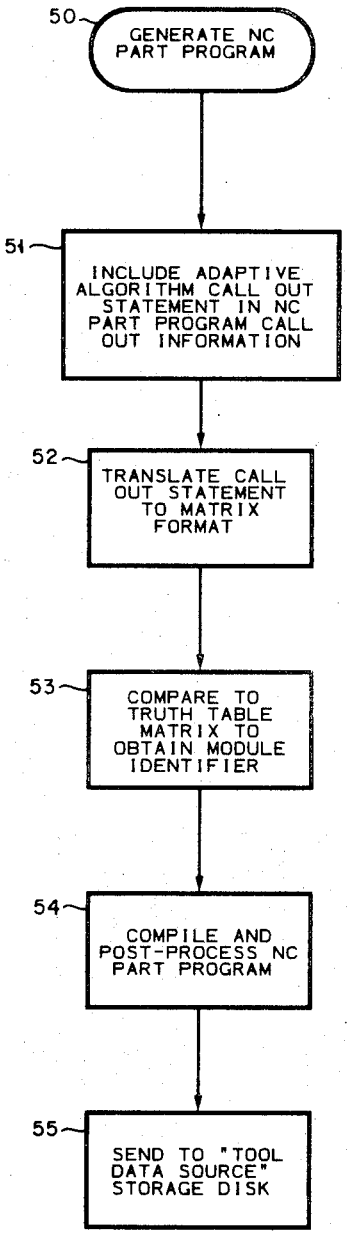
Figure 4:
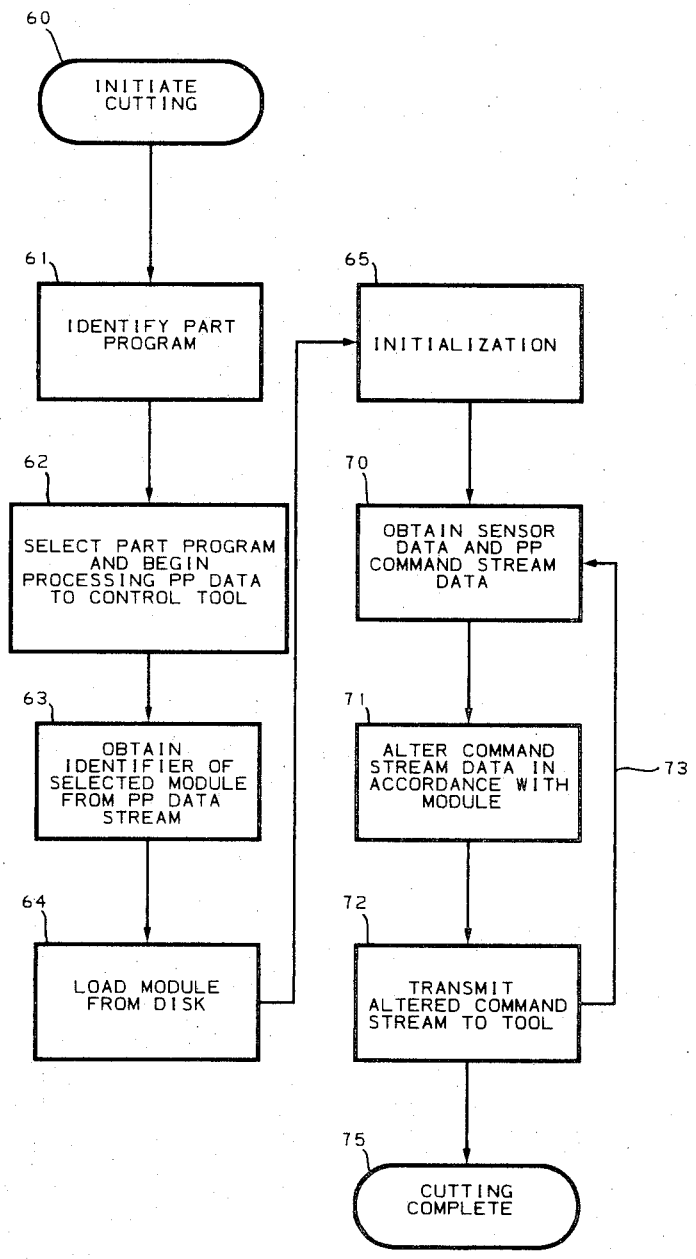
Figure 5:
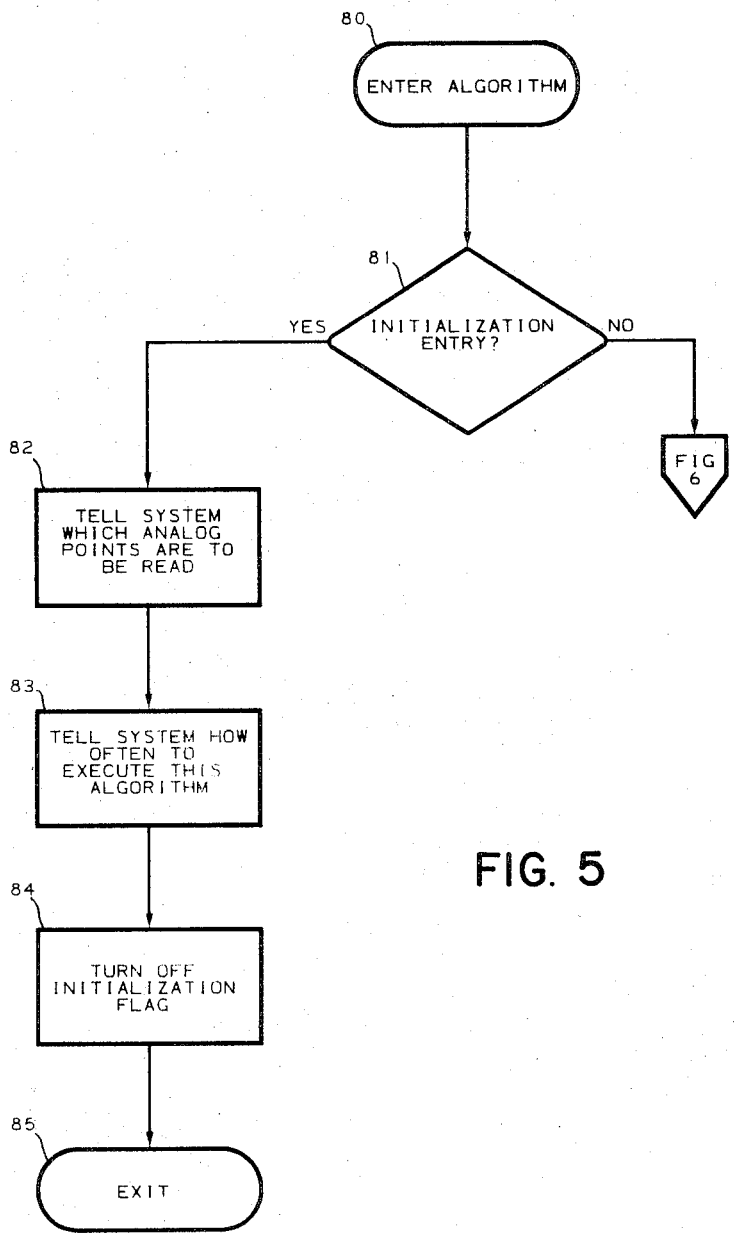
Figure 6:
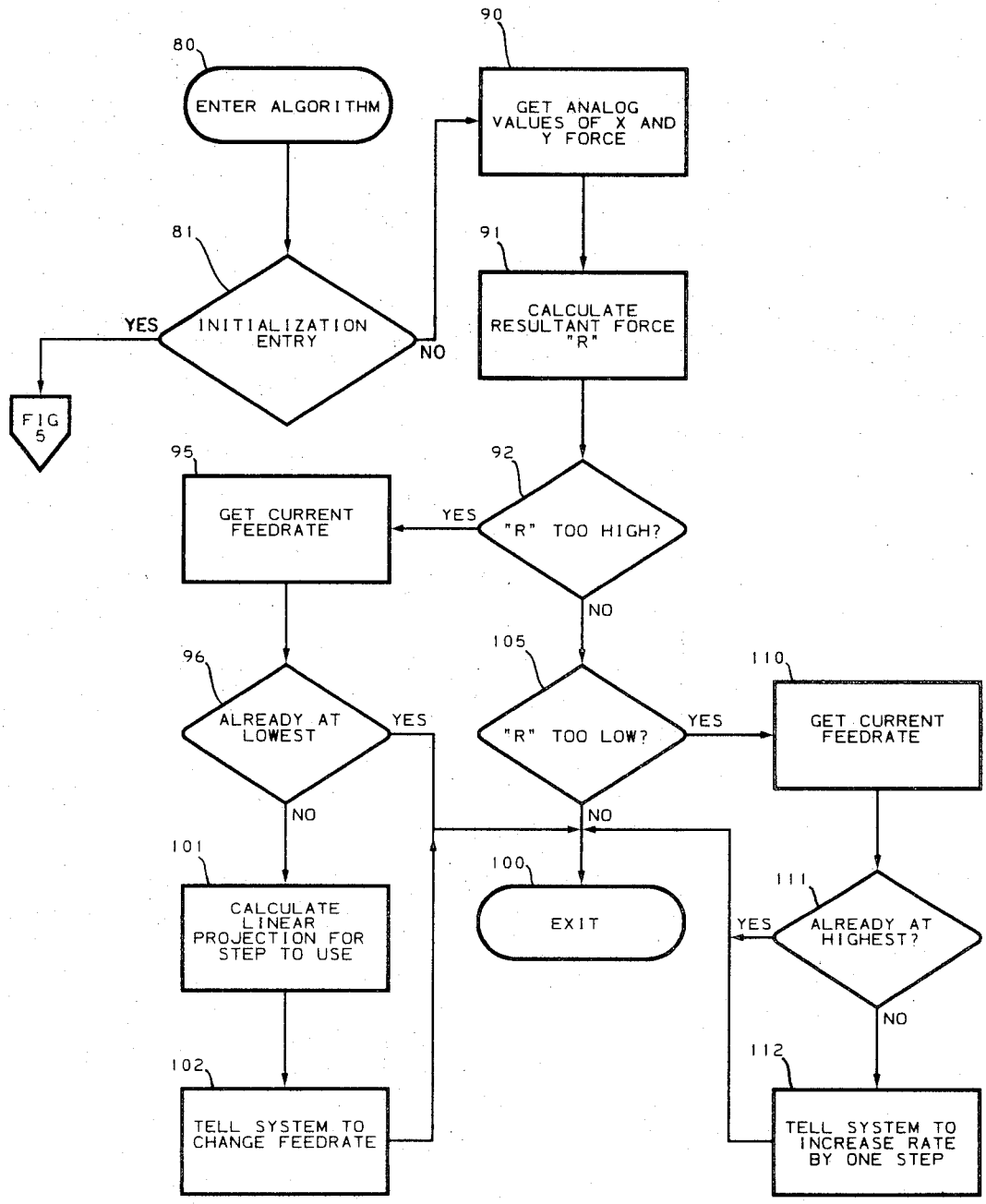
Figure 7:
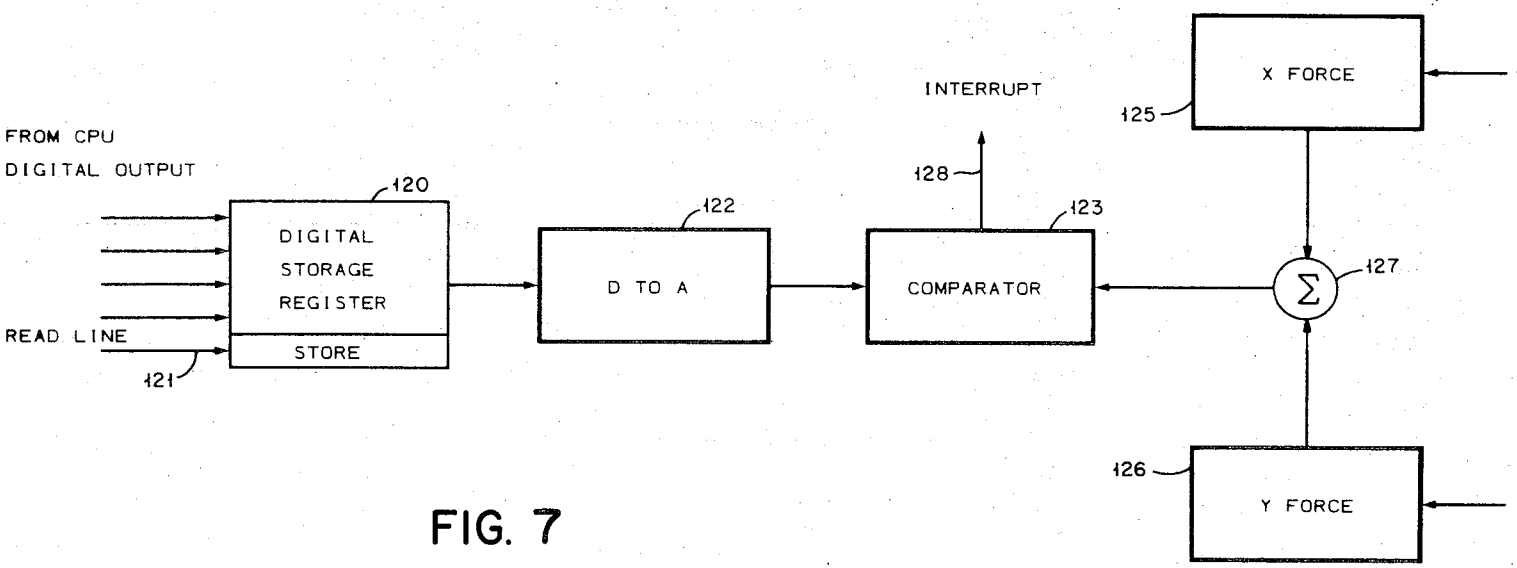
Figure 8:
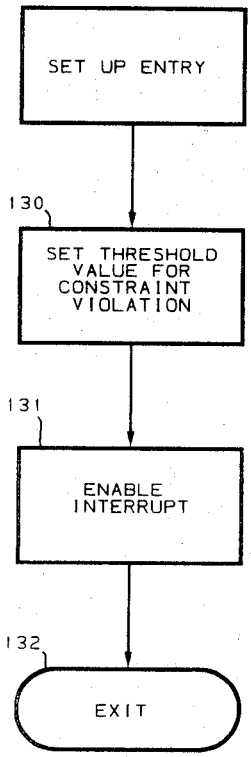
Figure 9:
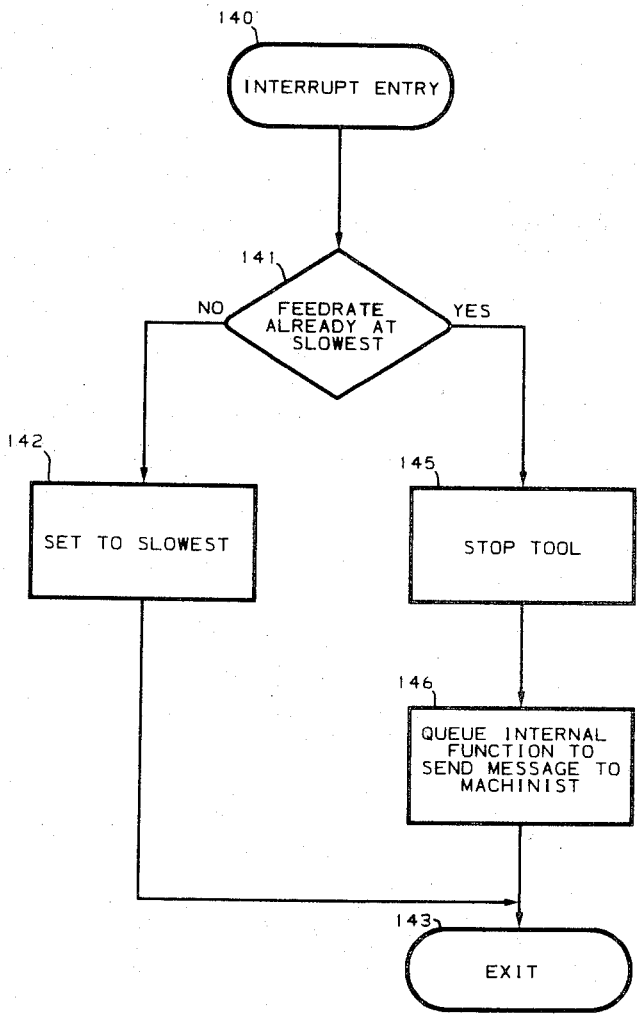
Figure 10:
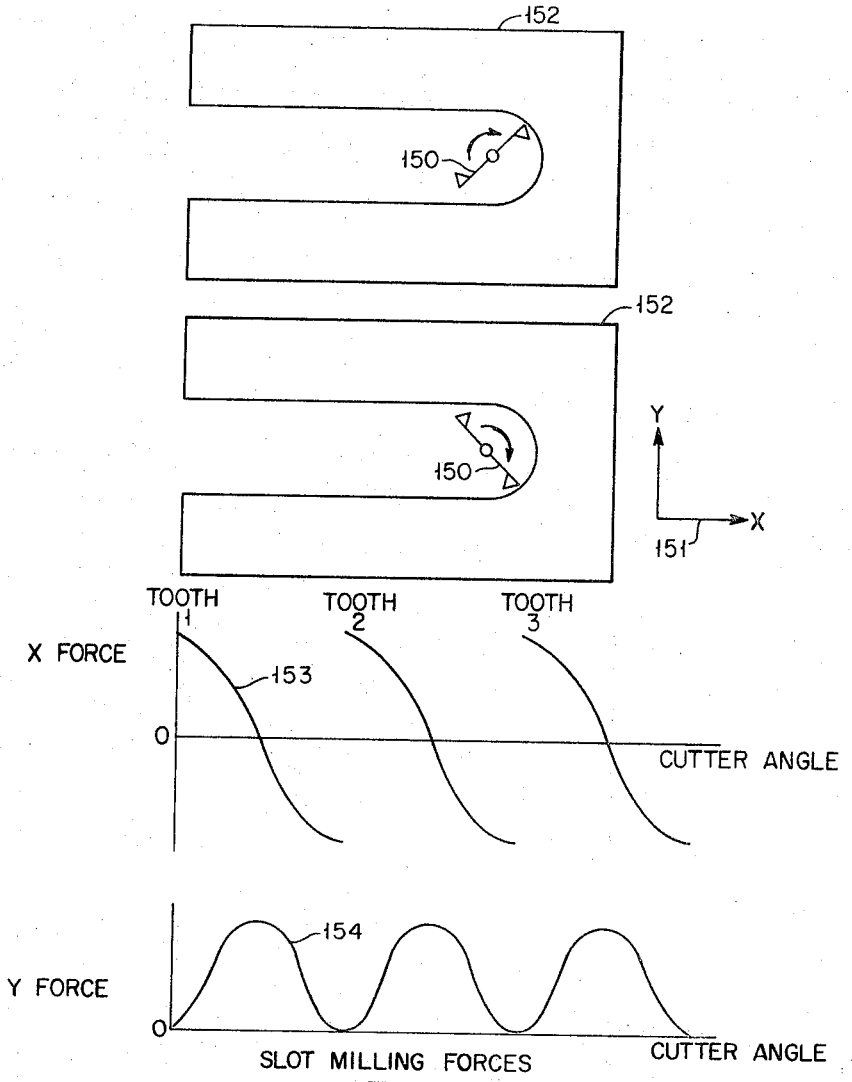
Figure 11:
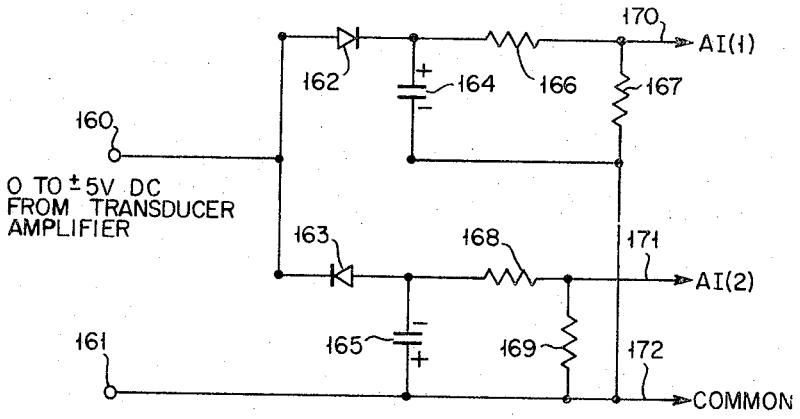
Figure 12:
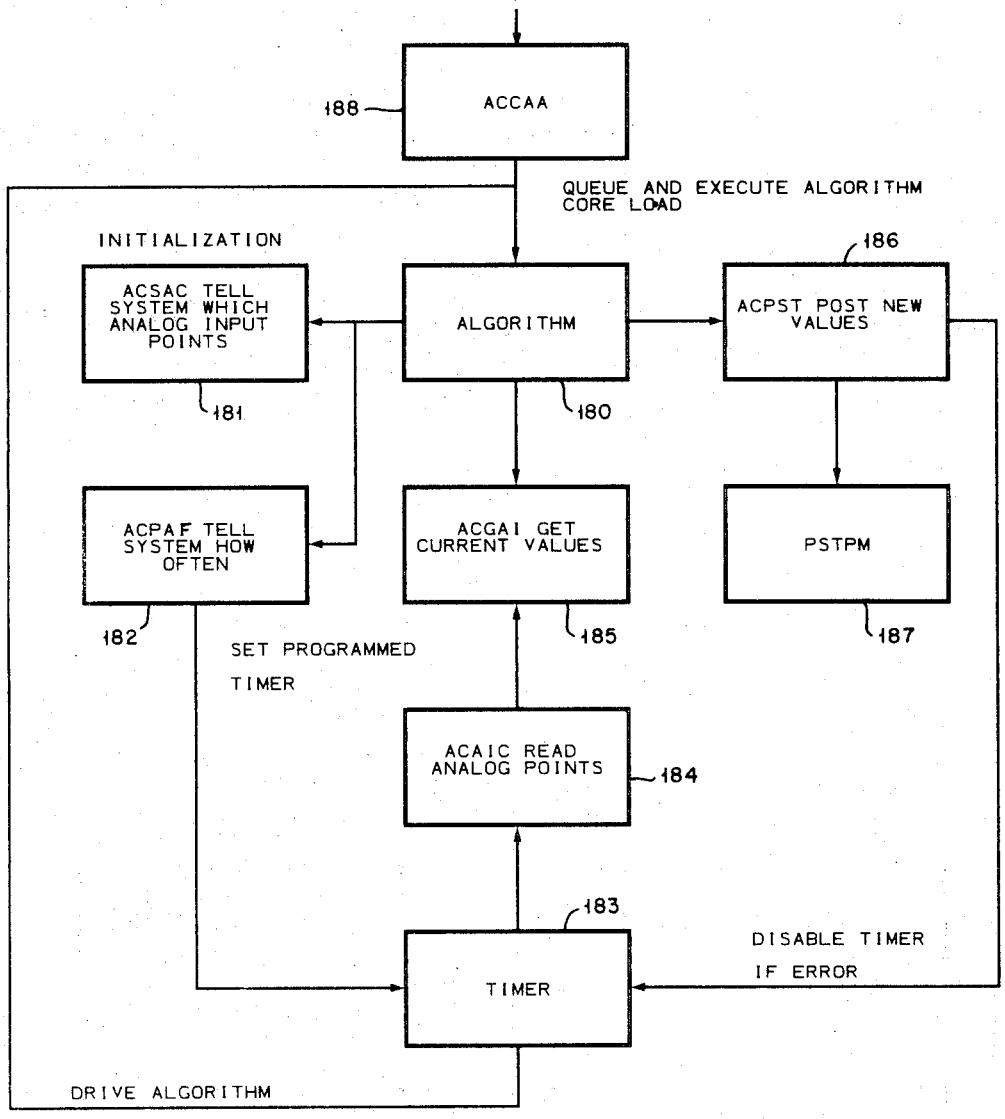
Figure 13:
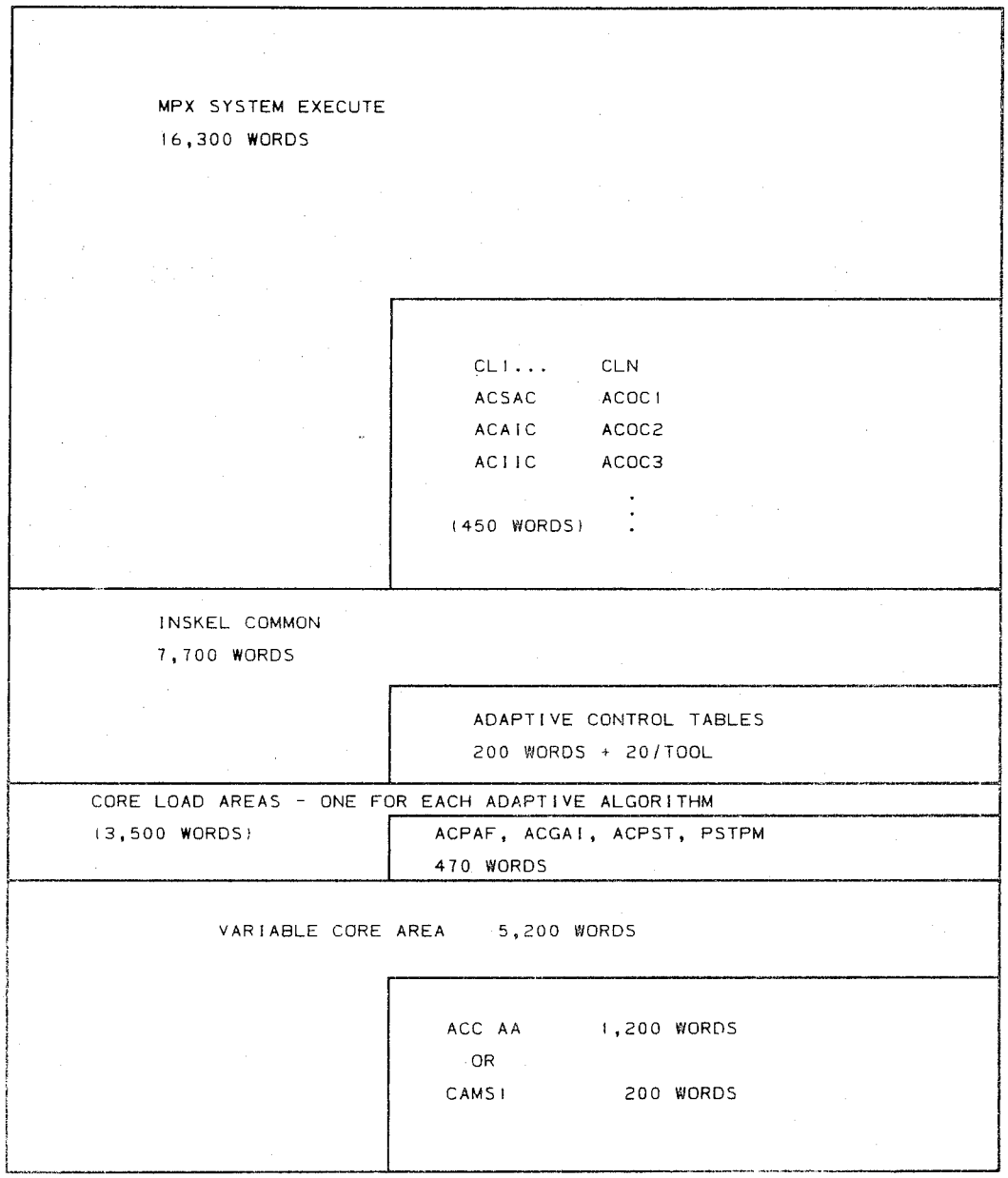

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 5, 1974

920 O.G. 8

T920,008

DYNAMICALLY MODIFIABLE ADAPTIVE MACHINE TOOL CONTROL SYSTEM AND METHOD

Walter B. Broadwell, Malibu, Richard M. Burkley, Los Angeles, and Royal H. Daw, Sherman Oaks, Calif., assignors to International Business Machines Corporation, Armonk, N.Y.

Continuation of abandoned application Ser. No. 251,727, May 8, 1972. This application Apr. 23, 1973, Ser. No. 353,180

**Int. Cl. G06f *15/46***

U.S. Cl. 340—172.5

10 Sheets Drawing. 41 Pages Specification

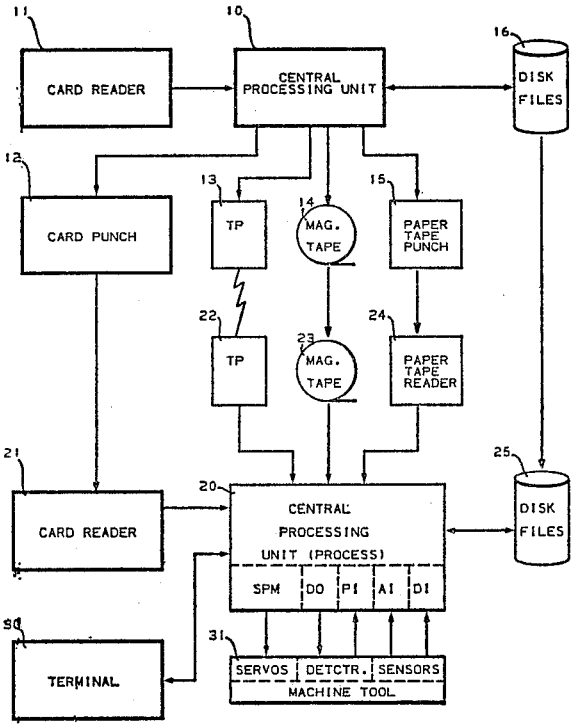

A system and method for adaptively controlling the operation of machine tools, the system including processing means for supplying control signals to each machine tool. A feedback means supplies feedback signals representing operation factors of the tool to the processing means. Storage means stores a plurality of adaptive control program modules, each arranged to operate the processing means to respond to the feedback to provide differing control parameter instructions. The storage means also stores part programs including operation instructions defining predetermined operations of the machine tool. A part programmer supplies a designation of the part program to be used and also supplies designations of characteristics of the machining, covering such things as the type of material, type of tool and type of cut. The processing means responds in accordance with the method by selecting the designated part program and by decoding the designations of machining characteristics to select one of the adaptive control program modules. The selected part program operation instructions cause the processing means to supply the control signals to the machine tool, the control signals being defined in terms of the defined operations as modified by the control parameter instructions.